B. KREHER.
METHOD OF MANUFACTURING TUBULAR BODIES OF CORRUGATED PASTEBOARD.
APPLICATION FILED MAR. 9, 1921.
1,426,879.
Patented Aug. 22, 1922.
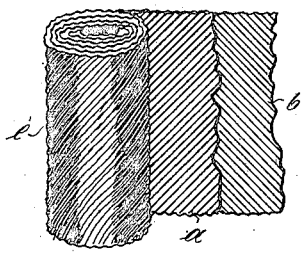
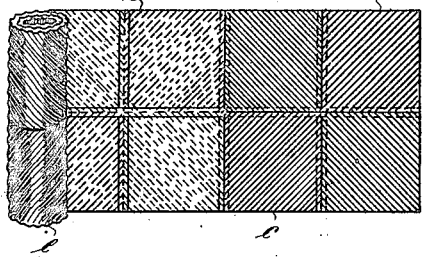
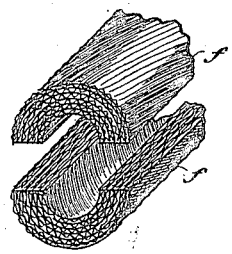

UNITED STATES PATENT OFFICE.

BERNHARD KREHER, OF DRESDEN, GERMANY.

METHOD OF MANUFACTURING TUBULAR BODIES OF CORRUGATED PASTEBOARD.

1,426,879.    Specification of Letters Patent.   Patented Aug. 22, 1922.

Application filed March 9, 1921. Serial No. 450,879.

*To all whom it may concern:*

Be it known that I, BERNHARD KREHER, a citizen of the German Republic, and residing at Dresden, Germany, have invented certain new and useful Improvements in a Method of Manufacturing Tubular Bodies of Corrugated Pasteboard, of which the following is a specification.

This invention relates to the manufacture of tubular bodies composed of a plurality of superposed layers of corrugated paste-board, said layers being combined by a binding agent and first made as flat pieces and then wound or rolled up, the products thus obtained showing the particularity that the corrugations of the combined layers of corrugated paste-board cross each other from layer to layer and that all the corrugations run diagonally to the winding direction. This has the advantage that the winding-up can be smoothly and uniformly effected without said corrugations bending and thereby producing irregularities in the product as is the case with corrugations running parallel to the winding-direction.

In the accompanying drawing:

Figs. 1 and 2 show two appropriate modes of combining the single layers of pasteboard and of winding or rolling them up to tubes;

Figs. 3 and 4 show tubular bodies made of the cylindrically or conically wound or rolled-up tubes and cut into two longitudinal halves.

Referring to Fig. 1:

Two or more large pieces *a*, *b* of corrugated paste-board of appropriate width and length are so placed above each other that the corrugations cross each other from layer to layer, said layers being combined by means of any suitable sticking-stuff and then mechanically wound or rolled up as shown at *e* with the aid of a removable core, the inner contact surfaces being also coated with sticking-stuff, the whole wound up body being thus firmly combined.

Referring to Fig. 2:

Small, preferably square or rectangular, pieces *c* of corrugated paste-board are sewn together, with their corrugations upside down and crossing each other to form a large square or rectangular piece, which is then turned over, whereupon a similarly composed large piece is sewn thereto, the corrugations *d* of said two large pieces being alternately located on the upper and lower sides thereof. The proceeding is then repeated to receive any desired lengths of such large pieces.

Upon the pieces thus composed being mechanically wound or rolled up, also with the employment of a removable core, with their inner contact surfaces coated with sticking-stuff, the body obtained shows single closed fields which, in case of the body being used for insulating purposes, increase the insulating capacity of the same.

The wound-up body produced as aforementioned is then impregnated to suit the object of employment of the same; for instance, against moisture, with water-glass, graphite, tar, asphaltum or the like, preferably by diving the body into such liquid mixture until it is saturated therewith, said impregnation having, besides, the advantage of wholly coating the body on its outside.

Figs. 3 and 4 show insulating cups for enveloping pipes or the like. The cups shown in Fig. 3 are made by dividing the cylindrical body into two identical halves *f* to be fastened around a conduit by means of a cord, wire or the like; while the cups shown in Fig. 4 are made by dividing the cylindrical body into two unequal halves having oblique contact surfaces *g*, the lower cup being thereby adapted to be clamped upon the conduit without holding it fast by hand when fastening the cups.

What I claim is:

1. A method of making tubular bodies of a plurality of superposed layers of corrugated paste-board, consisting in first combining said layers as flat pieces and then winding them up, the corrugations of the combined layers crossing each other from layer to layer and running diagonally to the winding-direction, substantially as and for the purpose set forth.

2. A method of making tubular bodies of a plurality of superposed layers of corrugated paste-board, consisting in first combining said layers as flat pieces and then winding them up, the corrugations of the combined layers crossing each other from layer to layer and running diagonally to the winding-direction, and finally cutting the tubular bodies into two longitudinal halves, substantially as and for the purpose set forth.

In testimony whereof I have hereunto set my hand in the presence of two subscribing witnesses.

BERNHARD KREHER.

Witnesses:
 WILHELM BEYER,
 KARL LANG.